(12) United States Patent
Kawasaki et al.

(10) Patent No.: US 11,185,059 B2
(45) Date of Patent: Nov. 30, 2021

(54) PURIFICATION METHOD FOR WATER, PURIFICATION DEVICE FOR WATER, AND USE OF SAID PURIFICATION DEVICE AT LOW WATER TEMPERATURE

(71) Applicant: Mitsubishi Chemical Corporation, Chiyoda-ku (JP)

(72) Inventors: Tetsuya Kawasaki, Chiyoda-ku (JP); Jun Ogawa, Kyoto (JP); Akinori Ando, Kyoto (JP); Daisei Ando, Yoichi-gun (JP); Ryohei Yasutomi, Eniwa (JP); Naoyuki Misaka, Muroran (JP)

(73) Assignee: Mitsubishi Chemical Corporation, Chiyoda-ku (JP)

(*) Notice: Subject to any disclaimer, the term of this patent is extended or adjusted under 35 U.S.C. 154(b) by 0 days.

(21) Appl. No.: 16/888,915

(22) Filed: Jun. 1, 2020

(65) Prior Publication Data

US 2020/0288681 A1    Sep. 17, 2020

Related U.S. Application Data

(63) Continuation of application No. PCT/JP2018/045115, filed on Dec. 7, 2018.

(30) Foreign Application Priority Data

Dec. 7, 2017  (JP) .............................. JP2017-234817
Jul. 6, 2018  (JP) .............................. JP2018-129240

(51) Int. Cl.
*A01K 63/04*  (2006.01)
*C02F 3/30*   (2006.01)
(Continued)

(52) U.S. Cl.
CPC ............ *A01K 63/045* (2013.01); *C02F 3/303* (2013.01); *C02F 3/305* (2013.01); *C02F 2101/16* (2013.01); *C02F 2103/20* (2013.01)

(58) Field of Classification Search
CPC ....... A01K 63/045; A01K 63/04; C02F 3/303; C02F 3/305; C02F 2101/16; C02F 2103/20; C02F 3/10; C02F 3/34
(Continued)

(56) References Cited

U.S. PATENT DOCUMENTS

2005/0061737 A1    3/2005  Linden et al.
2009/0321350 A1*  12/2009  Nelson .................. C12M 29/06
                                                  210/610

(Continued)

FOREIGN PATENT DOCUMENTS

JP         3-49630 A      3/1991
JP        10-85782 A      4/1998
2018/0305233     A1      10/2018 Takita
(Continued)

OTHER PUBLICATIONS

Machine-generated English translation of WO 2017/110296, generated on Apr. 30, 2021.*

(Continued)

*Primary Examiner* — Fred Prince
(74) *Attorney, Agent, or Firm* — Oblon, McClelland, Maier & Neustadt, L.L.P.

(57) ABSTRACT

Provided is a purification method for water to be used for culture of an aquatic organism, wherein the method includes a nitrification step of oxidizing ammonia to nitric acid using a nitrifying bacterium adhering to a base material containing an alkaline earth metal, and a denitrification step of reducing nitric acid to nitrogen using a denitrifying bacterium adher-
(Continued)

ing to a base material containing a biodegradable resin which has a structural unit derived from dicarboxylic acid.

11 Claims, 6 Drawing Sheets

(51) Int. Cl.
*C02F 101/16* (2006.01)
*C02F 103/20* (2006.01)

(58) Field of Classification Search
USPC .......... 210/167.22, 615, 616, 617, 150, 151; 119/227, 260
See application file for complete search history.

(56) References Cited

U.S. PATENT DOCUMENTS

| | | | |
|---|---|---|---|
| 2019/0014754 A1* | 1/2019 | Endo | C02F 3/305 |
| 2019/0092666 A1* | 3/2019 | Park | C02F 3/305 |
| 2020/0095147 A1 | 3/2020 | Takita | |

FOREIGN PATENT DOCUMENTS

| | | |
|---|---|---|
| JP | 2006-149221 A | 6/2006 |
| JP | 2008-301787 A | 12/2008 |
| JP | 2010-88307 A | 4/2010 |
| JP | 2014-24000 A | 2/2014 |
| WO | WO 2017/073304 A1 | 5/2017 |
| WO | WO 2017/110296 A1 | 6/2017 |

OTHER PUBLICATIONS

Extended European Search Report dated Oct. 23, 2020 in European Patent Application No. 18885134.9, 8 pages.
International Search Report dated Mar. 12, 2019 in PCT/JP2018/045115 filed Dec. 7, 2018, 2 pages.
Taiwanese Office Action dated Jul. 18, 2019 in Taiwanese Application 107144229 (with English Translation), 18 pages.
English translation of the International Preliminary Report on Patentability dated Jun. 9, 2020 in PCT/JP2018/045115 filed Dec. 7, 2018, 6 pages.

* cited by examiner

PURIFICATION METHOD FOR WATER, PURIFICATION DEVICE FOR WATER, AND USE OF SAID PURIFICATION DEVICE AT LOW WATER TEMPERATURE

CROSS-REFERENCE TO RELATED APPLICATION

This is a continuation of International Application PCT/JP2018/045115, filed on Dec. 7, 2018, and designated the U.S., and claims priority from Japanese Patent Application 2017-234817 which was filed on Dec. 7, 2017 and Japanese Patent Application 2018-129240 which was filed on Jul. 6, 2018, the entire contents of which are incorporated herein by reference.

TECHNICAL FIELD

The present invention relates to a purification method for water and a purification apparatus for water to be used for culture of an aquatic organism, and use of the purification apparatus at low water temperature.

BACKGROUND ART

In culture of fish or the like, it has been necessary to frequently replace water in the culture tank or the like by, for example, drawing fresh water from a river or the like in order to prevent the cultured fish or the like from being harmed by ammonia converted from nitrogen components which are generated from feces, remaining feed, and the like of the cultured fish generate.

However, the replacement of water requires use of a large amount of water, and, for example, in cases where the culture is carried out in an inland area having no sea or river in its vicinity, the replacement of a large amount of water is difficult. Furthermore, the replacement of water inevitably produces a large amount of wastewater, and discharging of the whole nitrogen generated as the wastewater during the culture into a river or the sea is undesirable also from the viewpoint of eutrophication of rivers and the like. Moreover, the effluent standard is becoming more and more strict from the viewpoint of environmental protection in recent years.

In order to solve this problem, the ammonia generated from fish or the like has been removed from the wastewater using a two-step reaction using microorganisms. More specifically, this method uses a reaction of converting ammonia to nitric acid, and a reaction of decomposing the nitric acid to nitrogen. After the decomposition to nitrogen, discharging into the air is possible without increasing the environment burden.

The reaction using the organisms, especially the latter reaction, that is, the reaction of decomposing the nitric acid to nitrogen, has been carried out using an anaerobic bacterium.

In the reaction using the microorganisms, the reaction of the first stage, that is, the reaction of converting ammonia to nitric acid, often uses a bacterium that naturally inhabits a calcium-containing base material such as shells that may be discarded without further use. On the other hand, the second stage, that is, the denitrification reaction for converting nitric acid to nitrogen, uses a polymer such as cellulose as a base material, together with a denitrifying bacterium inhabiting this base material.

The use of cellulose or the like as a base material in the second-stage reaction is based on a principle which has been described as follows (see Patent Document 1). "A biodegradable polymer such as a natural polymer or a biodegradable synthetic resin can be a substrate or a hydrogen donor for growth and proliferation of heterotrophic (organotrophic) bacteria. Denitrifying bacteria, which are facultative anaerobic microorganisms, gather and adhere onto the biodegradable polymer, where, in the presence of nitrogen oxides such as nitrites and nitrates, these bacteria utilize oxygen in the nitrogen oxides for respiration under conditions where the water contains only a very small amount of dissolved oxygen, which respiration enables reductive removal of the nitrogen oxides."

In techniques that have been disclosed, biodegradable resins are exemplified as base materials that are other than cellulose and can be used for the denitrification reaction (see Patent Documents 2 and 3).

On the other hand, as an apparatus for performing denitrification reaction for a rearing water containing oxygen at a level enough to allow growth of fish, a structure in which a filter containing therein a biodegradable plastic is arranged in a channel of a filtration device, wherein the upper side of the filter is in contact with air, has been disclosed (see Patent Document 4). In this technique, the biodegradable plastic is contained in the inside of the filter, and aerobic microorganisms are present on the periphery of the filter, and therefore, the biodegradable plastic, where the denitrification occurs, is in a state where oxygen is decreased due to consumption of oxygen by the aerobic microorganisms. Further, recently, an apparatus which uses the principle of siphon to expose cellulose having a denitrifying bacterium adhering thereto to the atmosphere, thereby allowing denitrification reaction has been published (Patent Document 5).

PRIOR ART DOCUMENTS

Patent Documents

Patent Document 1: JP H10-85782 A
Patent Document 2: JP 2014-24000 A
Patent Document 3: JP 2010-88307 A
Patent Document 4: JP 2006-149221 A
Patent Document 5: WO 2017/110296 A1

SUMMARY OF THE INVENTION

Problems to be Solved by the Invention

In cases where an apparatus having the smallest possible size was used for culturing a large number of aquatic organisms, the processes described in the above patent documents failed, in some cases, to remove nitric acid at a sufficient rate, causing a gradual increase in the nitric acid concentration (nitrate-nitrogen concentration) and hence adversely affecting the aquatic organism or the like cultured.

In order to solve such a problem, the present invention provides a water purification method to enable culture of a large number of aquatic organisms using a small apparatus even without replacement of water, and a water purification apparatus.

Means for Solving the Problems

In the course of a study carried out in order to solve the above problem, the present inventors used, as the base material where the bacterium to be used for the denitrification in the second stage is allowed to inhabit, a biodegradable resin having a more stable property compared to natural products such as cellulose and having a particular chemical structure, thereby completing the present invention. Conventionally, the denitrification reaction has been carried out in a state where the biodegradable resin having a denitrifying bacterium adhering thereto was not exposed to the atmosphere, however, in contrast, the present inventors discovered that, by exposing the biodegradable resin to the atmosphere, the denitrification capacity can be increased, and a larger number of aquatic organisms can be cultured with a single treatment apparatus. The present invention includes the following.

<1> A purification method for water to be used for culture of an aquatic organism, wherein the method comprises
  a nitrification step of oxidizing ammonia to nitric acid using a nitrifying bacterium adhering to a base material comprising an alkaline earth metal, and
  a denitrification step of reducing nitric acid to nitrogen using a denitrifying bacterium adhering to a base material comprising a biodegradable resin which has a structural unit derived from dicarboxylic acid.

<2> The purification method for water according to <1>, wherein the biodegradable resin has two or more kinds of structural units derived from dicarboxylic acid.

<3> The purification method for water according to <1> or <2>, wherein the biodegradable resin is exposed to the atmosphere.

<4> The purification method for water according to <3>, wherein the biodegradable resin is exposed to the atmosphere by a method using the principle of siphon.

<5> The purification method for water according to any one of <1> to <4>, wherein the temperature of the water is not more than 18° C.

<6> The purification method for water according to <5>, wherein the aquatic organism is a fish belonging to the family Salmonidae.

<7> A purification apparatus for water to be used for culture of an aquatic organism, wherein the apparatus comprises
  a base material comprising an alkaline earth metal, for growing a nitrifying bacterium that oxidizes ammonia to nitric acid, and
  a base material comprising a biodegradable resin which has a structural unit derived from dicarboxylic acid, for growing a denitrifying bacterium that reduces nitric acid to nitrogen.

<8> Use of the purification apparatus according to <7> for purification of water in culture of an aquatic organism at a water temperature of not more than 18° C.

Effect of the Invention

By the present invention, a denitrification method and a denitrification apparatus which enable efficient denitrification can be provided. Further, a purification method and a purification apparatus capable of removing ammonia and decreasing the nitric acid concentration (nitrate-nitrogen concentration) in water even in cases where a large number of aquatic organisms are cultured using a relatively small apparatus, can be provided.

The objects and the effects of the present invention are not limited to those described above, and also include objects and effects evident to those skilled in the art from the entire description.

MODE FOR CARRYING OUT THE INVENTION

The present invention is described below in detail. The following description of constituents illustrates one example (representative example) of embodiments of the present invention, and the present invention is not limited to these contents. The present invention may be carried out with various modifications within the scope of its spirit.

The purification method of the present embodiment is a purification method for water to be used for culture of an aquatic organism, the method comprising: a nitrification step of oxidizing ammonia to nitric acid using a nitrifying bacterium adhering to a base material containing an alkaline earth metal; and a denitrification step of reducing nitric acid to nitrogen using a denitrifying bacterium adhering to a base material containing a biodegradable resin which has a structural unit derived from dicarboxylic acid.

A water purification apparatus preferably used for the purification method of the present embodiment is described below.

Figure 1:
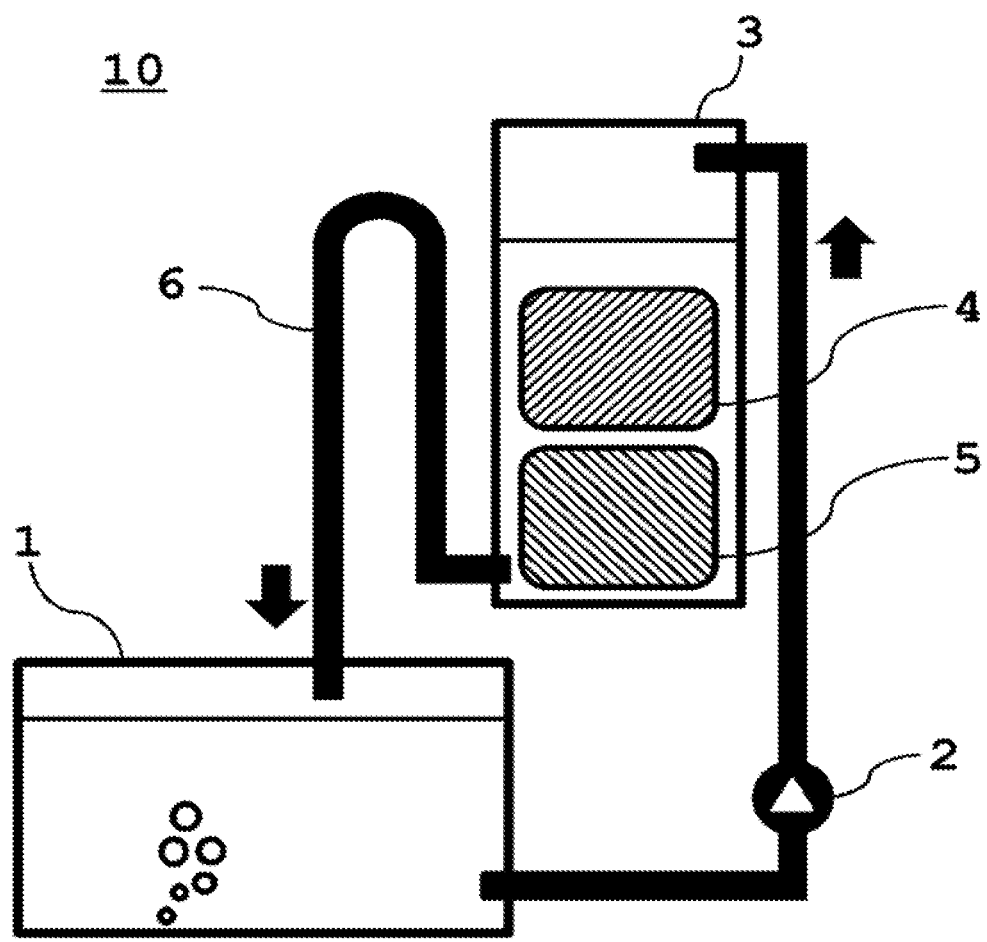
FIG. 1 is an overview of an aquatic-organism rearing apparatus using a purification apparatus according to an embodiment and an experimental example.
Figure 2:
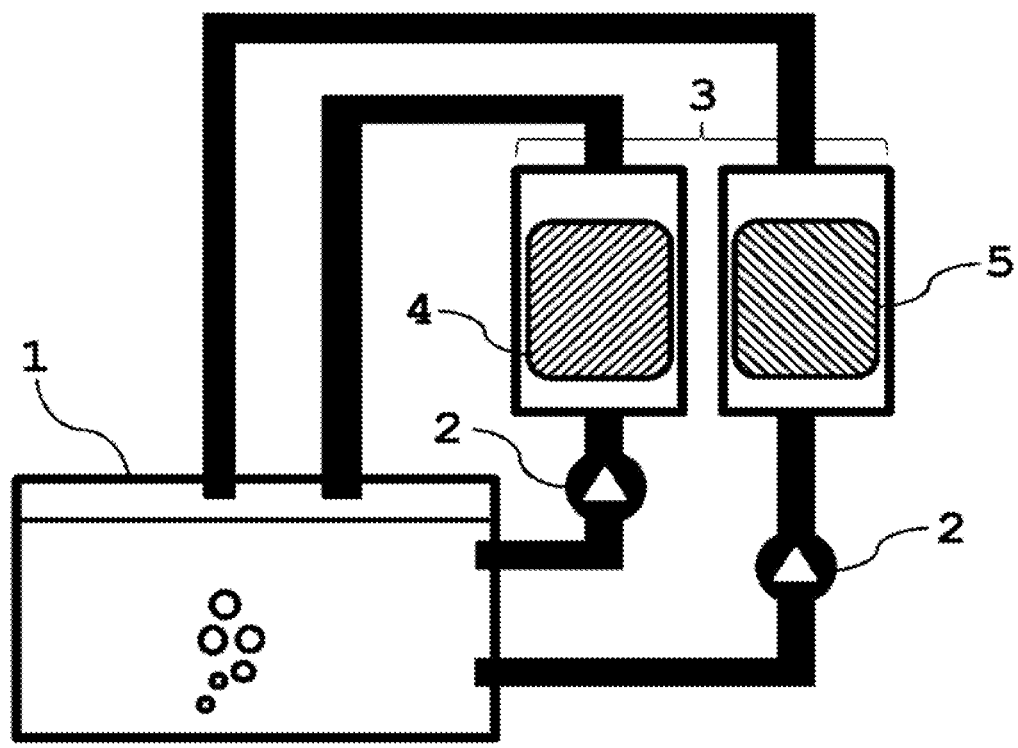
FIG. 2 is an overview of an aquatic-organism rearing apparatus using a purification apparatus according to an embodiment.
Figure 3:
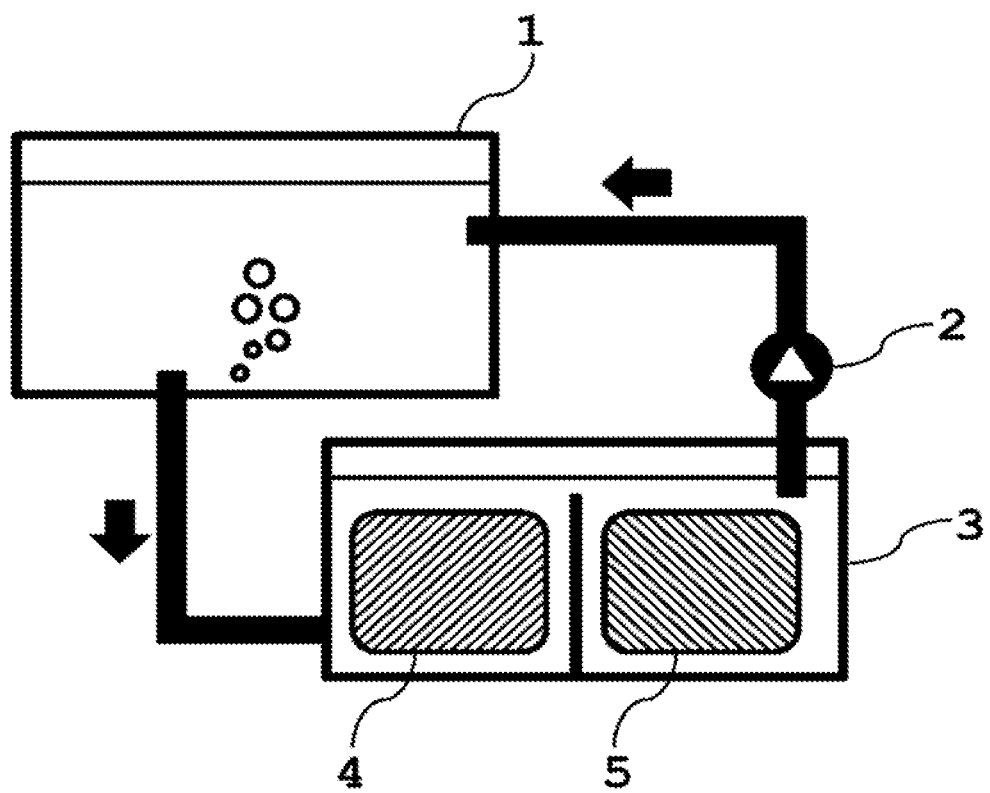
FIG. 3 is an overview of an aquatic-organism rearing apparatus using a purification apparatus according to an experimental example.

The purification apparatus of the present embodiment is used for culture of an aquatic organism, and comprises: a base material containing an alkaline earth metal; and a biodegradable resin base material having a structural unit derived from dicarboxylic acid. FIG. 1 to FIG. 3 are schematic diagrams each illustrating a configuration of an aquatic-organism rearing apparatus using a purification apparatus according to the embodiment.

The aquatic-organism rearing apparatus 10 illustrated in FIG. 1 comprises a rearing tank 1, a pump 2, a purification apparatus 3, a base material 4 containing an alkaline earth metal, a biodegradable resin base material 5 having a structural unit derived from dicarboxylic acid, and a siphon 6. The apparatus may also include another component not shown in the figure.

The rearing tank 1 is a tank for culturing an aquatic organism. The size, shape, and the like of the rearing tank 1 may be appropriately set depending on the type and the number of the aquatic organism to be cultured. The rearing tank does not necessarily need to be a tank as long as the aquatic organism can be cultured.

The aquatic organism to be cultured is not limited as long as it is an organism living in water. Typical examples of the aquatic organism include, but are not limited to, fresh-water fish such as salmon, trout, ayu, and char; and crustaceans such as crabs and shrimps. For the culture, fresh water or sea water is typically used. In cases where sea water is used, its salinity is not limited.

The oxygen concentration (DO) in the water in the rearing tank 1 is not less than 5 mg/L, preferably not less than 6 mg/L, more preferably not less than 7 mg/L, still more preferably not less than 8 mg/L, especially preferably not less than 9 mg/L, most preferably not less than 10 mg/L. In cases where the oxygen concentration (DO) in the water is higher than the lower limit value, an environment suitable for inhabitation by aquatic organisms can be provided.

The concentration of ammonia-nitrogen in the water in the rearing tank 1 is not more than 10 mg/L, more preferably not more than 8 mg/L, still more preferably not more than 6 mg/L, especially preferably not more than 4 mg/L.

In cases where the ammonia-nitrogen concentration is higher than the upper limit value, aquatic organisms are lethally affected. In cases where the ammonia-nitrogen concentration is not more than the upper limit value, an environment suitable for inhabitation by aquatic organisms can be provided.

The pump 2 is means for transferring water in the rearing tank 1 to the purification apparatus 3. The pump 2 is not limited as long as water in the rearing tank 1 can be transferred to the purification apparatus 3, and the pump 2 may be replaced by another transfer means. The water transfer rate by the pump 2 is not limited. Since a low transfer rate may lead to insufficient supply of oxygen to the bacteria, the transfer rate is preferably not less than a certain level. The transfer rate may be at a level which allows circulation of the water in the rearing tank 1 once per day, or may be at a level which allows circulation of the water in the rearing tank 1 two or more times per day, for example, once per 12 hours, once per 10 hours, once per 6 hours, once per 4 hours, once per 2 hours, once per hour, once per 30 minutes, or once per 10 minutes.

The purification apparatus 3 comprises: a base material 4 containing an alkaline earth metal; and a biodegradable resin base material 5 having a structural unit derived from dicarboxylic acid.

The base material 4 containing an alkaline earth metal is a base material for growing a bacterium for conversion of ammonia in the water transferred from the rearing tank 1, to nitric acid. As the bacterium for conversion of the ammonia to nitric acid, a bacterium already known to have such a function may be used as appropriate.

The alkaline earth metal is preferably not sintered. Sintering kills bacteria that have been originally adhering to the alkaline earth metal.

The base material 4 containing an alkaline earth metal is not limited as long as it is a base material containing an alkaline earth metal. The base material 4 is preferably a base material containing calcium as the alkaline earth metal (which may be hereinafter referred to as "calcium-containing base material"). Further, from the viewpoint of utilization of wastes, it is preferred to use shells, coral sand, or the like.

In cases where shells or the like are used as the base material 4 containing an alkaline earth metal, they may be placed as they are, may be placed after coarse crushing, or may be placed after pulverization, in the purification apparatus 3.

The base material containing an alkaline earth metal is preferably not sintered. Sintering kills bacteria that have been originally adhering to the base material containing an alkaline earth metal.

When ammonia is converted to nitric acid, the nitric acid lowers the pH of the water in the purification apparatus 3. By using a base material containing an alkaline earth metal as the base material that allows growth of the bacterium for conversion of ammonia to nitric acid, the pH can be controlled to promote the growth of the nitrifying bacterium.

The biodegradable resin base material 5 having a structural unit derived from dicarboxylic acid is a base material which allows a denitrifying bacterium, that is capable of converting nitric acid generated by the bacterium growing on the base material containing an alkaline earth metal, to adhere thereto; and which supplies the carbon source required for the denitrification. As the bacterium for the conversion of the nitric acid to nitrogen, a bacterium already known to have such a function may be used as appropriate. As biodegradable resins, PLA (polylactic acid)-based, PBS (polybutylene succinate)-based, PCL (polycaprolactone)-based, and PHB (polyhydroxybutyrate)-based resins are commonly known. In the present invention, as the biodegradable resin base material 5, a synthetic biodegradable resin having a structural unit derived from dicarboxylic acid is used. Such a synthetic biodegradable resin may have a structural unit derived from diol.

The type of the biodegradable resin is preferably a polyester. Examples of the type of the dicarboxylic acid include succinic acid, adipic acid, oxalic acid, malonic acid, glutaric acid, suberic acid, azelaic acid, sebacic acid, terephthalic acid, isophthalic acid, and phthalic acid. The biodegradable resin preferably has two or more kinds of structural units derived from dicarboxylic acid. Such cases tend to exhibit a higher denitrification rate and a higher denitrification performance compared to cases where a biodegradable resin having only one kind of structural unit derived from dicarboxylic acid is used. In particular, the biodegradable resin preferably has a structural unit derived from succinic acid. In other words, the biodegradable resin is preferably a PBS-based biodegradable resin containing a butylene succinate unit as a major repeat unit. Preferred specific examples of the PBS-based biodegradable resin include polybutylene succinate, poly(butylene succinate/adipate) (PBSA), and poly(butylene succinate/carbonate). Poly(butylene succinate/adipate) (PBSA) is especially preferred because of its high biodegradability, and of the fact that it enables sustained supply of the carbon source required for the denitrification. Moreover, PBSA is preferred also as a substrate or a hydrogen donor for growth and proliferation of the denitrifying bacterium since it is more degradable than other biodegradable resins such as PHB-based resins.

The biodegradable resin base material 5 may also contain a resin such as polylactic acid or PHA. By the inclusion of such a resin having a biodegradability different from that of the synthetic biodegradable resin having a structural unit derived from dicarboxylic acid, the biodegradable resin base material 5 can be used as a carbon source for a long time. The biodegradable resin base material 5 may also contain a component other than resins, such as calcium carbonate or calcium stearate. In cases where the amount of such a component is not more than 40% by mass with respect to the synthetic biodegradable resin, fine powder resulting from the component drops from the base material, to increase the surface area of the polymer, thereby allowing efficient denitrification.

The shape of the biodegradable resin base material 5 is not limited, and may be any of a bulk shape (rectangular shape, spherical shape, or the like), flake shape, granular shape, fibrous shape, and the like. Taking ease of filling into account, the shape is preferably a flake shape, granular shape, fibrous shape, or the like. In cases of a granular shape, its minor axis and major axis are both preferably 0.5 mm to 4 mm. In cases of a fibrous shape, the diameter of the cross-section of the fiber is preferably 1 μm to 3000 μm.

The amount of the biodegradable resin base material 5 arranged in the purification apparatus 3 is preferably 0.016% by mass to 50% by mass with respect to the amount of the water in the aquatic-organism rearing apparatus 10. The amount of the biodegradable resin base material 5 arranged in the purification apparatus 3 is preferably 1% by mass to 1000% by mass with respect to the amount of the base material 4 containing an alkaline earth metal. In cases where the amount of the biodegradable resin base material 5 is not less than the lower limit value and not more than the upper limit value, the denitrification can be efficiently carried out.

As the denitrification reaction proceeds, the biodegradable resin base material 5 is consumed, and its volume gradually decreases. At the time when the volume decreases to about half, the decreased volume may be supplemented to maintain the denitrification performance.

In cases where the biodegradable resin base material 5 has a fibrous shape, maintenance of the fibrous structure becomes impossible as the denitrification reaction proceeds, and the base material breaks into small pieces. In such a state, additional fibers may be supplemented to maintain the denitrification performance.

The base material 4 containing an alkaline earth metal, and the biodegradable resin base material 5, in the purification apparatus 3 may be arranged in the same tank, or may be arranged in separate tanks.

In cases where the base material 4 containing an alkaline earth metal and the biodegradable resin base material 5 are arranged in the same tank, these may be separated from each other by, for example, a separator made of fibers, or a filter paper. In FIG. 1, the base material 4 containing an alkaline earth metal is arranged in the upper side, and the biodegradable resin base material 5 is arranged in the lower side. However, these may be arranged in the reverse order, or may be arranged adjacent to each other.

In cases where the base material 4 containing an alkaline earth metal and the biodegradable resin base material 5 are arranged in separate tanks, the apparatus may have a mechanism that enables passing of water through each tank.

The siphon 6 is transfer means that enables transfer of water from the purification apparatus 3 to the rearing tank 1, and is, at same time, a mechanism that exposes the biodegradable resin base material 5 to the atmosphere. When the water level in the purification apparatus 3 becomes higher than the top portion of the siphon 6, water in the purification apparatus 3 is transferred to the rearing tank 1, to expose the biodegradable resin base material 5 to the atmosphere. By the exposure of the biodegradable resin base material 5 to the atmosphere, the denitrification rate tends to increase, resulting in a high denitrification performance.

Other than the use of a siphon, the means of transferring water from the purification apparatus 3 to the rearing tank 1 may be transfer of water from the purification apparatus 3 to the rearing tank 1 using a pump. Further, rearing water may be pumped up from the rearing tank 1, and supplied by showering from the upper portion of the purification apparatus 3, to achieve the transfer of water. The biodegradable resin base material 5 may be brought into contact with the atmosphere by supplying air or oxygen into the water in the purification apparatus 3.

Although the aquatic-organism rearing apparatus 10 may also include a foam fractionation apparatus, the present embodiment does not need to include such an apparatus. By the inclusion of a foam fractionation apparatus, the chemical oxygen demand (COD) can be reduced. However, in the present embodiment, reduction of COD is possible without inclusion of a foam fractionation apparatus.

The above description illustrates an aquatic-organism rearing apparatus wherein a tank in which a base material 4 containing an alkaline earth metal is arranged, and a tank in which a biodegradable resin base material 5 is arranged, are arranged in a single channel. Alternatively, these tanks may be arranged in separate channels. More specifically, as in the aquatic-organism rearing apparatus 10 illustrated in FIG. 2, a channel that passes through a base material 4 containing an alkaline earth metal, for performing the nitrification, and a channel that passes through a biodegradable resin base material 5, for performing the denitrification, may be provided.

The aquatic-organism rearing apparatus 10 illustrated in FIG. 2 may also include another component not shown in the figure, such as a siphon 6.

In cases where a low-temperature fish such as a fish belonging to the family Salmonidae is reared at a low water temperature of not more than 18° C., conventional water treatment using microorganisms fails sufficient growth of the microorganism that promotes the denitrification, resulting in difficulty in suppression of an increase in the nitrate-nitrogen concentration, which adversely affects the reared fish. However, in the purification apparatus 3 according to the present embodiment of the present invention, the microorganism that promotes the denitrification can be sufficiently proliferated even at a low water temperature of not more than 18° C., so that the increase in the nitrate-nitrogen concentration in the rearing water can be suppressed.

The temperature of the water in the tank in which the aquatic organism is reared is preferably not more than 18° C., more preferably 5° C. to 15° C., still more preferably 5° C. to 12° C., most preferably 8° C. to 12° C. In cases where the temperature is not more than the upper limit, the growth of juvenile fish which have quickly acclimated to the feed can be suppressed, so that these juvenile fish and those which have slowly acclimated to the feed show only a small difference in the growth. Thus, the size can be kept uniform among the individuals, and the risk of cannibalism can therefore be prevented. In cases where the temperature is not less than the lower limit, freezing of the water can be prevented, and slowing of the growth of the aquatic organism can be suppressed.

Accordingly, another embodiment of the present invention is a purification method for water to be used for culture of an aquatic organism, the method using the purification apparatus 3 described above to purify the water, wherein the temperature of the water is not more than 18° C.

The means for maintaining the temperature of the water in the tank, in which the aquatic organism is reared, at the above-described temperature is not limited as long as the water temperature can be maintained at the above-described temperature. For example, in cases of an indoor tank, the water temperature may be maintained by controlling the room temperature within a certain range. The water temperature may be maintained also by placing a heater, chiller, or the like for the tank.

EXAMPLES

The present invention is described below in more detail by way of Examples. Needless to say, however, the scope of the present invention is not limited to the modes described in the following Examples.

Experimental Example 1-1

Rainbow trout were reared using only the rearing tank 1 in FIG. 1. After the nitrate ion concentration (nitrate-nitrogen concentration) reached 160 ppm, 90 L of the resulting liquid was kept at 11.3° C. while the nitrate-nitrogen concentration was measured. The nitrate-nitrogen concentration after leaving the liquid to stand for 36 days was 170 ppm, indicating no substantial change.

The measurement of the nitrate-nitrogen concentration was carried out by ion chromatography. For the ion chromatography, IC-2010, TSKgel SuperIC column, manufactured by Tosoh Corporation, was used together with an aqueous solution of 0.0019 mol/L sodium hydrogen carbonate and 0.0032 mol/L sodium carbonate as an eluent.

Experimental Example 1-2

The aquatic-organism rearing apparatus illustrated in FIG. 3 was placed. After the nitrate-nitrogen concentration reached 160 ppm, 90 L of the resulting liquid was kept at 11.3° C. while the nitrate-nitrogen concentration was measured. Regarding the purification apparatus used for the aquatic-organism rearing apparatus, the inside of the purification apparatus 3 is separated into two compartments, where the left tank in the figure, which is for growing a bacterium that causes the reaction from ammonia to nitric acid (2 kg of sea urchin shells were arranged therein as a calcium-containing base material), and the right tank in the figure, which is for growing a bacterium that causes the reaction from nitric acid to nitrogen (1 kg of PBSA was arranged therein), are arranged adjacently to each other. A pump was operated to cause circulation of the above water volume 90 L at 180 L/hr. By this, the water in the rearing tank was circulated once per 30 minutes. As a result, the nitrate-nitrogen concentration decreased to 96 ppm by Day 36.

Experimental Example 1-3

The same experiment as in Experimental Example 1-2 was carried out except that the resin used for the right tank in FIG. 3 was PHBV (polyhydroxybutyrate-co-valerate) instead of PBSA. As a result, the nitrate-nitrogen concentration on Day 36 was 127 ppm.

Experimental Example 1-4

The aquatic-organism rearing apparatus illustrated in FIG. 1 was placed. After the nitrate-nitrogen concentration reached 160 ppm, 90 L of the resulting liquid was kept at 11.3° C. while the nitrate-nitrogen concentration was measured. Contaminated water from the rearing tank 1 is supplied to the purification apparatus 3 by the pump 2, and the upper tank in the figure, which is for growing a bacterium that causes the reaction from ammonia to nitric acid (a calcium-containing base material was arranged therein), and the lower tank in the figure, which is for growing a bacterium that causes the reaction from nitric acid to nitrogen (PBSA was arranged therein), are arranged such that they are vertically connected to each other. To the lower portion of this purification apparatus, the siphon 6 is connected. Based on this structure, when the water level in the purification apparatus 3 reaches the top portion of the siphon 6, the water in the purification apparatus 3 is totally discharged to expose the PBSA to the atmosphere. According to the amount of water supplied from the rearing tank 1 to the purification apparatus 3 by the pump 2, the biodegradable resin is exposed to the atmosphere once per 5 minutes.

This apparatus was operated for 36 days. As a result, the nitrate-nitrogen concentration became 39 ppm.

Figure 4:
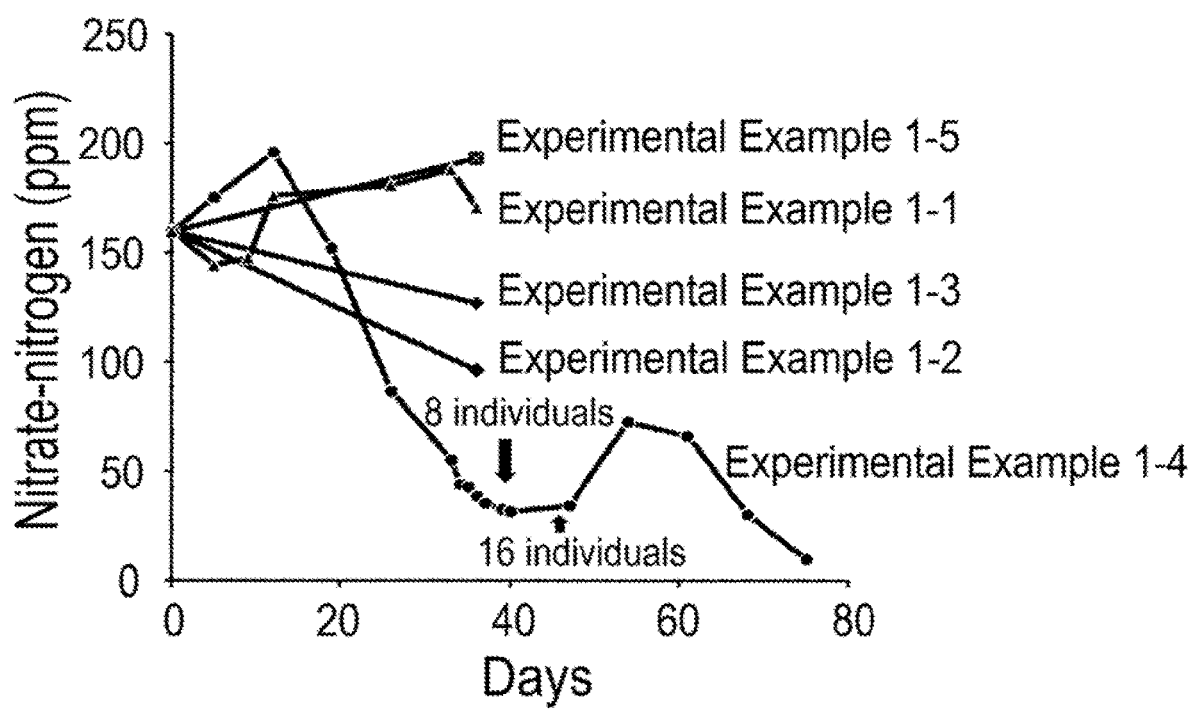
FIG. 4 is a graph illustrating changes in the nitrate-nitrogen concentration measured in experimental examples.

After additional 40 days of operation, the nitrate-nitrogen concentration was found to have decreased to 32 ppm. Here, eight rainbow trout were released into the rearing tank, and changes in the nitrate-nitrogen concentration were measured. As a result, the concentration was 34 ppm on Day 47, indicating that the concentration hardly changed. Then, the number of rainbow trout was increased to 16. As a result, the concentration increased to 73 ppm by Day 54, but decreased thereafter. The concentration decreased to 30 ppm by Day 68, and to 10 ppm by Day 75. These results are shown in FIG. 4.

Experimental Example 1-5

The same experiment as in Experimental Example 1-2 was carried out except that the resin used for the lower tank in FIG. 1 was PHBV (polyhydroxybutyrate-co-valerate) instead of PBSA. As a result of 36 days of operation, the nitrate-nitrogen concentration became 193 ppm.

(Experimental Example 2-1

Figure 5:
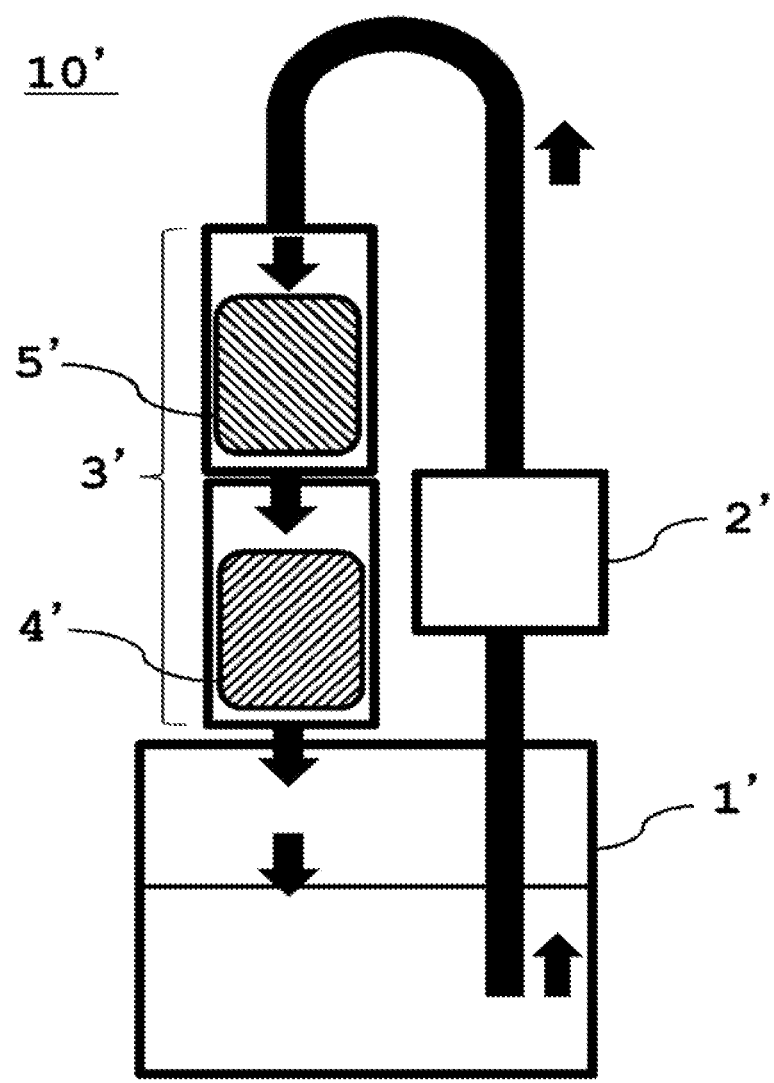
FIG. 5 is an overview of an aquatic-organism rearing apparatus using a purification apparatus according to an experimental example.

Using the aquatic-organism rearing apparatus 10' shown in FIG. 5, a water purification test was carried out. The aquatic-organism rearing apparatus 10' shown in FIG. 5 comprises: a rearing tank 1'; a Perista Pump (registered trademark) 2'; a purification apparatus 3'; a base material 4' composed of sea urchin shells; and a biodegradable resin base material 5'.

First, the aquatic-organism rearing apparatus 10' shown in FIG. 5 was provided.

More specifically, in a tank in which 500 g of sea urchin shells were immersed, 3 L of water and three goldfish having a weight of about 1 g were placed. The goldfish were reared for 2 months, during which the goldfish were fed with about 0.1 g of feed every 3 days. In this system, nitrogen supplied by the feed is excreted as ammonia. A nitrifying bacterium was grown on the sea urchin shells by allowing consumption of the ammonia. Acclimation of the nitrifying bacterium was carried out on the sea urchin shells in this manner, to obtain sea urchin shells supporting the nitrifying bacterium (hereinafter referred to as "nitrifying support"). In the system after the acclimation on the sea urchin shells, accumulation of ammonia was not found, but accumulation of nitric acid was found. In a conical tube in which a plurality of pores were formed at the bottom to allow passing of only water, 50 mL of the resulting nitrifying support was placed to prepare a column containing the nitrifying support placed therein (hereinafter referred to as "nitrifying column").

Subsequently, in a plastic container having a capacity of 500 mL, a mixture was prepared with 50 mL of PBSA pellets having a diameter of about 2 mm, 50 g of a waste liquid containing activated sludge collected from wastewater treatment equipment, and 50 g of the waste liquid obtained by the rearing of the goldfish, in which nitric acid was accumulated. Thereafter, acclimation was allowed at 37° C. for 6 days, to obtain PBSA pellets supporting a denitrifying bacterium (hereinafter referred to as "denitrifying support").

In a conical tube in which a plurality of pores were formed at the bottom to allow passing of only water, 50 mL of the resulting denitrifying support was placed to prepare a column containing the denitrifying support placed therein (hereinafter referred to as "denitrifying column"). The denitrifying column was arranged on the top of the nitrifying column.

Subsequently, in a rearing tank composed of a plastic container having a capacity of 1 L, 500 mL of a simulated rearing water having the composition shown in Table 1 was placed. The rearing tank was arranged under the nitrifying column.

Further, one end of a silicone tube having an inner diameter of about 1 mm and a length of about 2000 mm was placed near the bottom portion of the rearing tank, and the other end was connected to the upper portion of the denitrifying column. Further, a Perista Pump (registered trademark) was set in the middle portion of the silicone tube. The Perista Pump was set such that the simulated rearing water is transferred from the bottom of the rearing tank to the denitrifying column arranged in the upper side, and such that the simulated rearing water drops to the upper portion of the denitrifying column at a rate of 20 mL/minute.

This enabled construction of a circulation system for the simulated rearing water in which the simulated rearing water is exposed to the atmosphere, and in which the simulated rearing water is brought into contact with the PBSA pellets and the sea urchin shells, followed by returning to the rearing tank. The aquatic-organism rearing apparatus 10' was thus prepared.

TABLE 1

| Component | Concentration |
| --- | --- |
| $K_2HPO_4$ | 5.3 mg-P/L |
| $MgSO_4 \cdot 7H_2O$ | 8.8 mg-Mg/L |
| $NaNO_3$ | 50 mg-N/L |
| $NH_4Cl$ | 5 mg-N/L |

Using the aquatic-organism rearing apparatus 10' prepared, a denitrification test was carried out by circulation of the simulated rearing water for 15 days. In the present Experimental Example, the denitrification test was carried out without rearing of an aquatic organism.

In the denitrification test, the simulated rearing water was collected from the rearing tank, and changes in the nitrate-nitrogen concentration with time were measured by ion chromatography. For the ion chromatography, IC-2010, TSKgel SuperIC column, manufactured by Tosoh Corporation, was used together with an aqueous solution of 0.0019 mol/L sodium hydrogen carbonate and 0.0032 mol/L sodium carbonate as an eluent.

Because of the concern that dilution of the simulated rearing water due to water used for the acclimation of the nitrifying support and the denitrifying support, and adsorption of nitric acid, nitrous acid, or the like to the nitrifying support and the denitrifying support, may affect the results until one week after the beginning of the circulation, the function of the denitrifying support was evaluated using as a reference the nitrate-nitrogen concentration on Day 8 after the beginning of the circulation.

Figure 6:
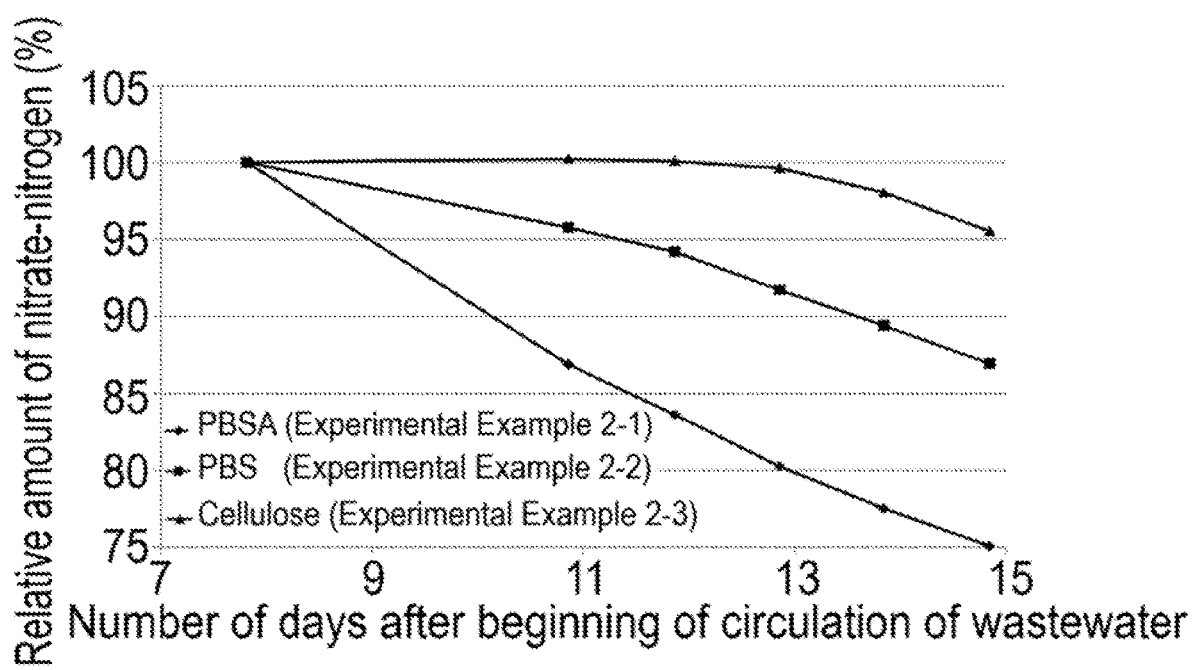
FIG. 6 is a graph illustrating changes in the relative amount of nitrate-nitrogen measured in experimental examples.

Taking the amount of nitrate-nitrogen on Day 8 after the beginning of the circulation as 100, the relative amounts of nitrate-nitrogen thereafter were plotted to prepare the graph shown in FIG. 6.

The denitrification rate in the aquatic-organism rearing apparatus 10' during the period from Day 8 to Day 15 after the beginning of the circulation was calculated based on the nitrate-nitrogen concentration in the simulated rearing water during the circulation. As a result, the amount of nitrogen that can be removed per day was found to be 0.011 kg per 1 $m^3$ of the denitrifying support (hereinafter expressed as kg-N/$m^3$/day), indicating a high denitrification performance.

On Day 15 after the beginning of the circulation, the dissolved oxygen concentration in the simulated rearing water in the rearing tank was measured using DO-5510HA, manufactured by MotherTool Co., Ltd. As a result, the dissolved oxygen concentration was 8.0 mg/L.

Experimental Example 2-2

An aquatic-organism rearing apparatus 10' was prepared in the same manner as in Experimental Example 2-1 except that PBS pellets having a diameter of about 2 mm were used instead of the PBSA pellets. A denitrification test was then carried out. FIG. 6 illustrates the changes in the relative amount of nitrate-nitrogen with time.

The denitrification rate in the aquatic-organism rearing apparatus 10' during the period from Day 8 to Day 15 after the beginning of the circulation was calculated in the same manner as in Experimental Example 2-1. As a result, the denitrification rate was found to be 0.008 kg-N/$m^3$/day, indicating a high denitrification performance.

On Day 15 after the beginning of the circulation, the dissolved oxygen concentration in the simulated rearing water in the rearing tank was 9.0 mg/L.

Experimental Example 2-3

An aquatic-organism rearing apparatus 10' was prepared in the same manner as in Experimental Example 2-1 except that cellulose spheres (a biodegradable resin having no structural unit derived from dicarboxylic acid) having a diameter of about 2 mm were used instead of the PBSA pellets. A denitrification test was then carried out. FIG. 6 illustrates the changes in the relative amount of nitrate-nitrogen with time.

The denitrification rate in the aquatic-organism rearing apparatus 10' during the period from Day 8 to Day 15 after the beginning of the circulation was calculated in the same manner as in Experimental Example 2-1. As a result, the denitrification rate was found to be 0.002 kg-N/$m^3$/day.

On Day 15 after the beginning of the circulation, the dissolved oxygen concentration in the simulated rearing water in the rearing tank was 9.2 mg/L.

From these results, it was found that Experimental Example 2-1, which uses PBSA having two kinds of structural units derived from dicarboxylic acid as the biodegradable resin for the denitrifying support, shows a higher denitrification rate and hence a higher denitrification performance than Experimental Example 2-2, which uses PBS having one kind of structural units derived from dicarboxylic acid.

It was further found that Experimental Example 2-1 or Experimental Example 2-2, which uses PBSA or PBS having a structural unit derived from dicarboxylic acid as the biodegradable resin for the denitrifying support, shows a higher denitrification rate, and hence a higher denitrification performance, than Experimental Example 2-3, which uses cellulose having no structural unit derived from dicarboxylic acid.

REFERENCE SIGNS LIST

10 Aquatic-organism rearing apparatus
1 Rearing tank
2 Pump
3 Purification apparatus
4 Base material containing alkaline earth metal
5 Biodegradable resin base material
6 Siphon

The invention claimed is:
1. A purification method for water, comprising
  oxidizing ammonia in water to nitric acid with a nitrifying bacterium adhered to a base material comprising an alkaline earth metal, and reducing the nitric acid in the water to nitrogen with a denitrifying bacterium adhered to a base material comprising a biodegradable resin, which has a structural unit derived from dicarboxylic acid.

2. The purification method for water according to claim 1, wherein the biodegradable resin at least two structural units derived from dicarboxylic acid.

3. The purification method for water according to claim 1, wherein the biodegradable resin is exposed to the atmosphere.

4. The purification method for water according to claim 3, wherein the biodegradable resin is exposed to the atmosphere via a siphon.

5. The purification method for water according to claim 1, wherein the temperature of the water is not more than 18° C.

6. The purification method for water according to claim 1, wherein the water is suitable to culture an aquatic organism.

7. The purification method for water according to claim 6, wherein the temperature of the water to be purified is at a temperature of not more than 18° C. and the aquatic organism is a fish of the Salmonidae family.

8. The purification method for water according to claim 1, wherein the alkaline earth metal is calcium and the biodegradable resin is at least one of polybutylene succinate, poly(butylene succinate/adipate) (PBSA), and poly(butylene succinate/carbonate).

9. A purification apparatus configured to purify water comprising
a base material comprising an alkaline earth metal, upon which a nitrifying bacterium that oxidizes ammonia to nitric acid can grow, and
a base material comprising a biodegradable resin, which has a structural unit derived from dicarboxylic acid, upon which a denitrifying bacterium that reduces nitric acid to nitrogen can grow.

10. A method of purifying water, comprising providing water from an aquatic organism culture to the purification apparatus according to claim 9 and wherein the water has a temperature of not more than 18° C.

11. The purification apparatus according to claim 9, wherein the water is suitable to culture an aquatic organism.

* * * * *